(12) United States Patent
Aota et al.

(10) Patent No.: US 7,241,068 B2
(45) Date of Patent: Jul. 10, 2007

(54) COUPLING STRUCTURE OF SHAFT BODY AND SHAFT JOINT

(75) Inventors: Kenichi Aota, Nara (JP); Shigetaka Kinme, Kashihara (JP)

(73) Assignee: Jtekt Corporation, Osaka (JP)

( * ) Notice: Subject to any disclaimer, the term of this patent is extended or adjusted under 35 U.S.C. 154(b) by 0 days.

(21) Appl. No.: 10/765,594

(22) Filed: Jan. 26, 2004

(65) Prior Publication Data
US 2004/0156670 A1 Aug. 12, 2004

(30) Foreign Application Priority Data
Jan. 29, 2003 (JP) ............................. 2003-020772

(51) Int. Cl.
*F16D 1/08* (2006.01)
*B62D 1/20* (2006.01)
*F16B 2/24* (2006.01)

(52) U.S. Cl. .................... 403/12; 403/155; 464/134
(58) Field of Classification Search .................. 403/12, 403/155, 290, 331, 373; 464/134
See application file for complete search history.

(56) References Cited

U.S. PATENT DOCUMENTS

| 4,900,178 A | 2/1990 | Haldric et al. | |
| 5,358,350 A * | 10/1994 | Oertle | 403/12 |
| 5,490,751 A * | 2/1996 | Courgeon | 411/368 |
| 6,155,739 A * | 12/2000 | Sekine et al. | 403/12 |
| 6,270,418 B1 | 8/2001 | Oka et al. | |
| 6,474,898 B1 * | 11/2002 | Aota et al. | 403/12 |

FOREIGN PATENT DOCUMENTS

| FR | 2771143 A1 * | 5/1999 |
| FR | 2802590 A1 * | 6/2001 |
| FR | 2815924 | 5/2002 |
| JP | 11030241 A * | 2/1999 |
| JP | 11280781 A * | 10/1999 |
| JP | 2000-310232 A1 | 7/2000 |
| JP | 2000-320562 A1 | 11/2000 |
| JP | 2001099178 A * | 4/2001 |

* cited by examiner

*Primary Examiner*—Daniel P. Stodola
*Assistant Examiner*—Ernesto Garcia
(74) *Attorney, Agent, or Firm*—Darby & Darby (57) ABSTRACT

The coupling structure includes: a shaft body 1 having an engagement portion 11 with a slip-off preventing groove; a shaft joint body 2 having an engagement groove 21 with which the engagement portion 11 is engaged and bores 22 and 23 facing the engagement groove 21; a locking body 3 press-fitted into the bore 23; and a plate body 5 having regulating tongues 51 for regulating movement of the shaft body 1, a supported portion 56 extending from the regulating tongues 51 and supported between the locking body 3 and the shaft joint body 2, and a projection 57 projecting from the supported portion 56. The shaft joint body 2 and/or the locking body 3 have a recessed portion 27 into which the projection 57 is fitted.

18 Claims, 8 Drawing Sheets

COUPLING STRUCTURE OF SHAFT BODY AND SHAFT JOINT

BACKGROUND OF THE INVENTION

1. Field of the Invention

The present invention relates to a coupling structure of a shaft body and a shaft joint.

2. Description of Related Art

A steering apparatus for a vehicle comprises: a steering shaft with one end connected to a steering wheel; a transmission shaft having, on one end thereof, a shaft joint connected to the other end of the steering shaft; and a pinion shaft coupled to the other end of the transmission shaft through the shaft joint and having a pinion meshing with the mid portion of a rack shaft which extends in the left and right direction of the vehicle.

The coupling structure of a shaft joint and a shaft body composed of a steering shaft or a pinion shaft is disclosed, for example, in Japanese Patent Application Laid-Open No. 2000-310232.

According to the coupling structure of Japanese Patent Application Laid-Open No. 2000-310232, an end of the shaft body has a non-circular engagement portion having a pair of parallel flat faces on a part of circular circumferential surface, and a slip-off preventing groove with both ends facing the flat faces. The shaft joint has an engagement groove with which the engagement portion is engaged so that relative rotation is impossible, and two concentric bores facing the engagement groove. A nut member having an edge portion is press-fitted into one of the bores. Moreover, a plate body is held on the outer circumference of the shaft joint. The plate body comprises a curved portion having through bores corresponding to the above-mentioned bores, respectively, and a regulating tongue extending from one end of the curved portion and inserted into the engagement groove. In this plate body, the periphery of the bore on the side opposite to the regulating tongue is referred to as a supported portion, which is supported between the edge portion and the shaft joint by press-fitting the nut member into one of the through bores.

The shaft body and the shaft joint are coupled up by: inserting the engagement portion of the shaft body into the engagement groove of the shaft joint from the edge side in the depth direction of the engagement groove to engage the engagement portion with the engagement groove; inserting a bolt into the through bores of the plate body, the bores of the shaft joint and the slip-off preventing groove; and tightening the bolt into the nut member so that relative movement in the axial direction and relative rotation are impossible. In this case, with the insertion of the engagement portion into the engagement groove, the regulating tongue of the plate body is deflected, and, after the engagement portion is engaged with the engagement groove, the regulating tongue is elastically restored, comes into contact with one side of the engagement portion, and regulates the movement of the engagement portion in a direction opposite to the insertion direction.

In the coupling structure constructed as described above, however, since the plate body is fastened to the shaft joint by supporting the flat supported portion, the fastening strength of the plate body is not sufficient and the plate body trembles. Thus there has been a demand for improvement. In order to increase the fastening strength of the plate body, the plate body may be fastened by welding or caulking. How-ever, since both of these techniques are special fastening techniques, there arise problems of poor workability and high costs.

BRIEF SUMMARY OF THE INVENTION

The present invention has been made with the aim of solving the above problems, and it is an object of the present invention to provide a coupling structure of a shaft body and a shaft joint, capable of increasing the fastening strength of the plate body in a simple manner without employing a special fastening technique.

A coupling structure of a shaft body and a shaft joint according to the present invention is a coupling structure for coupling a shaft body to a shaft joint having an engagement groove with which the shaft body is engaged, a shaft joint body with two bores facing the engagement groove and a locking body press-fitted into one of the bores, with a coupling shaft inserted into the bores and locked with the locking body, characterized by comprising: a regulating tongue for regulating movement of the shaft body; a supported portion extending from the regulating tongue and supported between the locking body and the shaft joint body; and a plate body having a projection projecting from the supported portion, wherein the shaft joint body and/or the locking body has a recessed portion into which the projection is fitted. The projection may be formed by providing a through bore of the supported portion with kerfs and bending a partial piece between the kerfs.

With this coupling structure whereby the projection projecting from the supported portion of the plate body can be fitted into the recessed portion of the shaft joint body and/or the locking body by press-fitting the locking body into the bore of the shaft joint body, it is possible to prevent trembling of the plate body and to increase the fastening strength of the plate body.

In the coupling structure of a shaft body and a shaft joint according to the present invention, the projection may have hardness higher than that of the shaft joint body and/or the locking body. The projection may be made of spring steel with hardness higher than that of the shaft joint body and/or the locking body. Further, the projection may be formed of a material with hardness not higher than that of the shaft joint body and/or the locking body, and the hardness of the projection may be made higher than that of the shaft joint body and/or the locking body by applying surface treatment.

With this coupling structure whereby it is possible to cause the projection projecting from the supported portion of the plate body to cut into the shaft joint body and/or the locking body by press-fitting the locking body into the bore of the shaft joint body, trembling of the plate body can be prevented without forming a recessed portion in advance.

The above and further objects and features of the invention will more fully be apparent from the following detailed description with accompanying drawings.

DETAILED DESCRIPTION OF THE INVENTION

Figure 1:
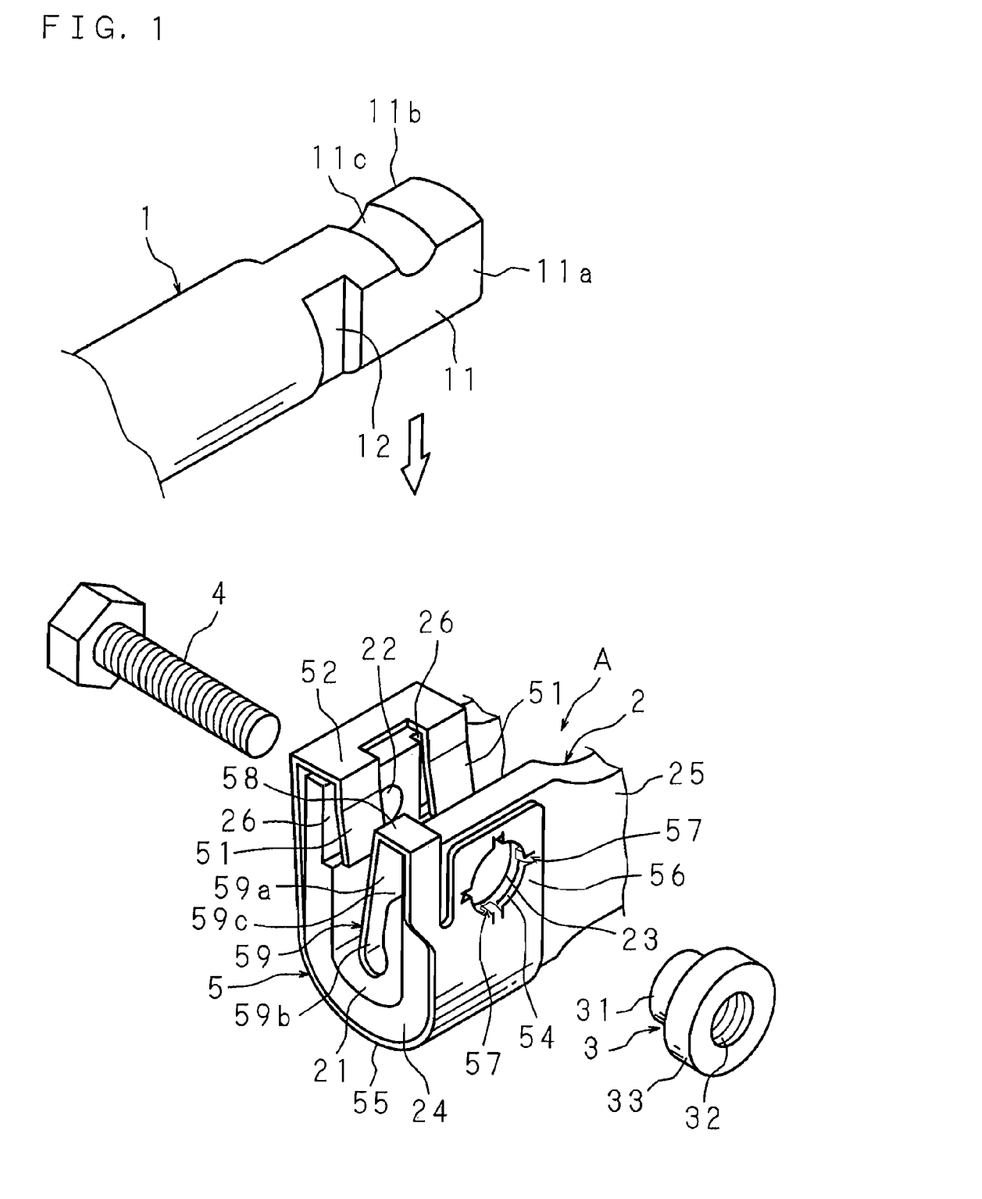
FIG. 1 is an exploded perspective view of a coupling structure according to the present invention.
Figure 2:
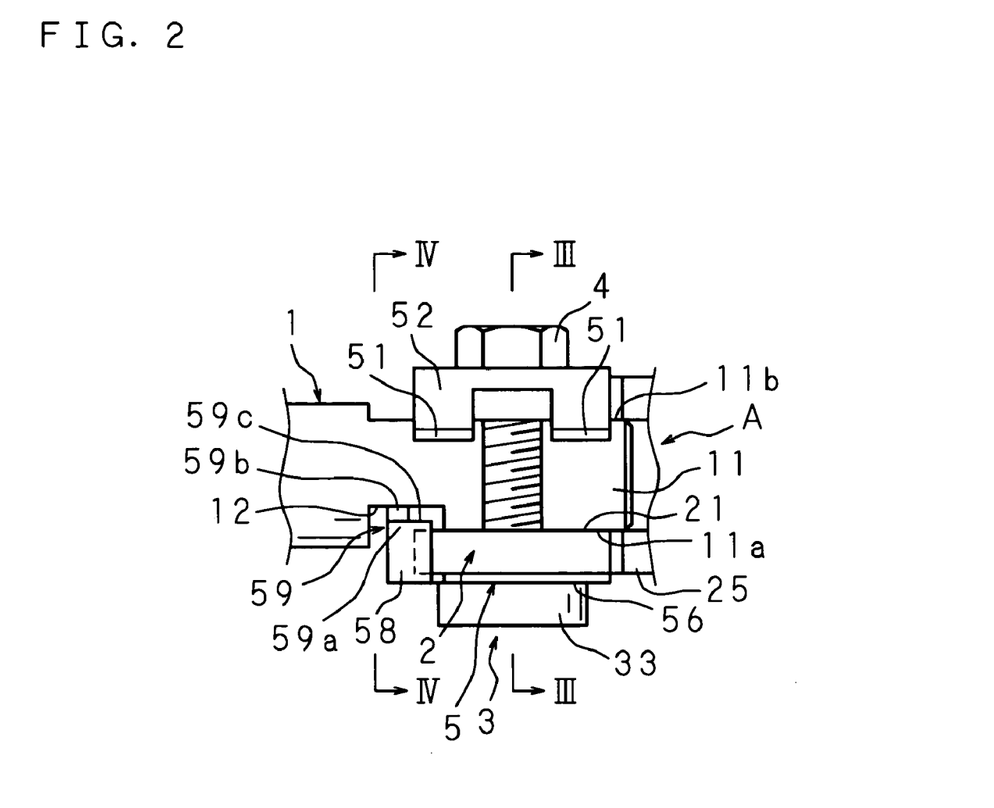
FIG. 2 is a plan view showing the coupling structure of the present invention.
Figure 3A:
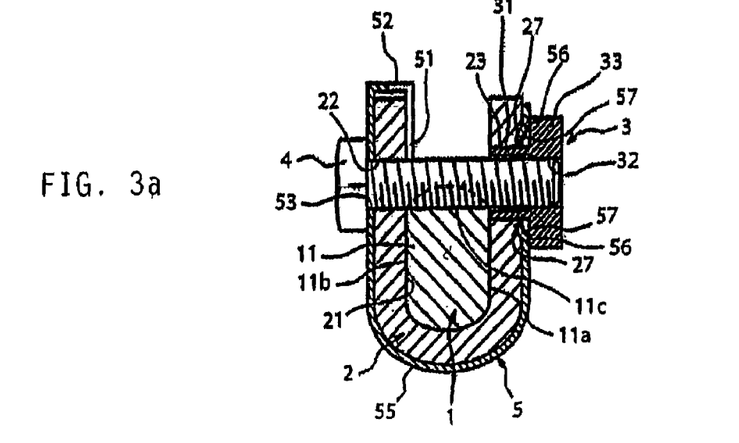
FIGS. 3a–3c are cross sectional views along the III—III line in FIG. 2 of alternative embodiments of the present invention.
Figure 3B:
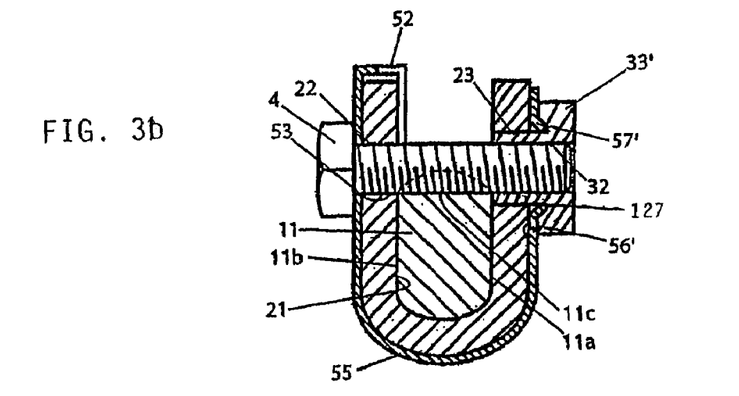
Figure 3C:
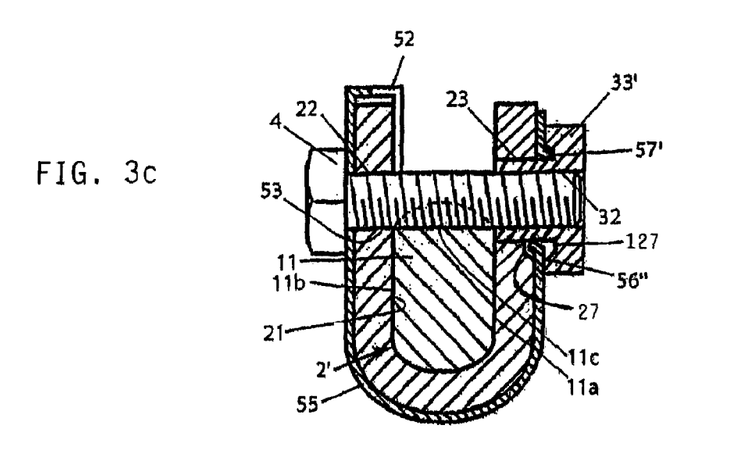
Figure 4:
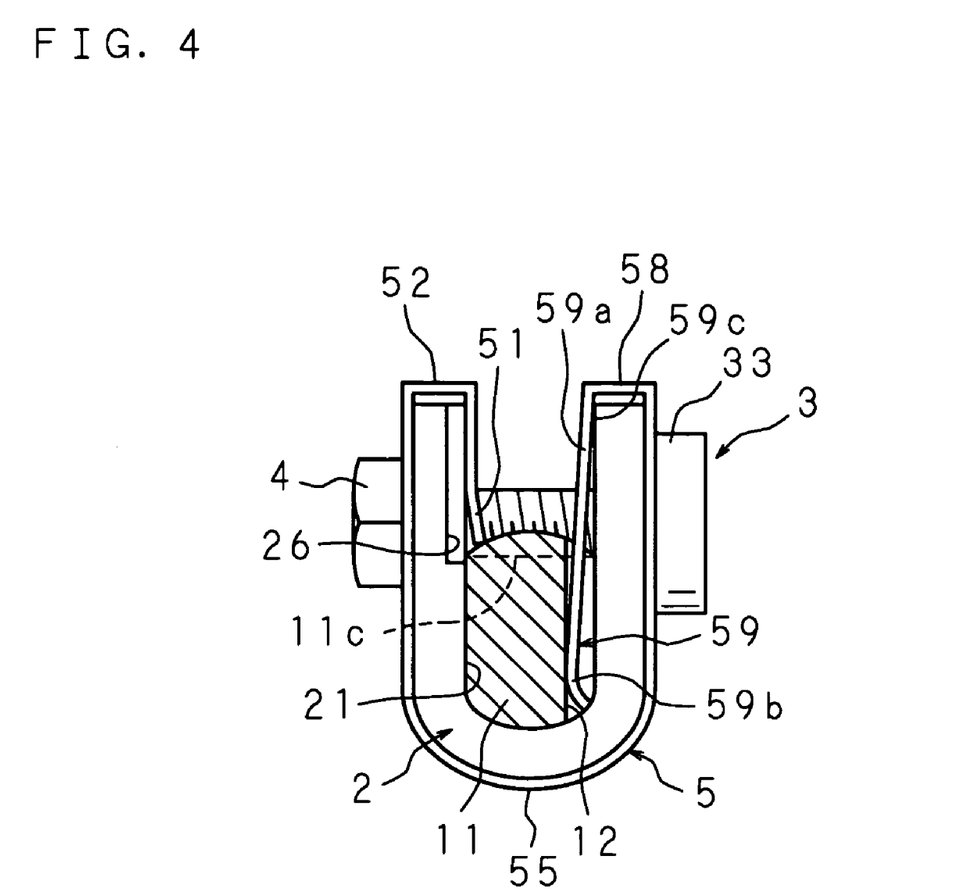
FIG. 4 is a cross sectional view along the IV—IV line in FIG. 2.

The following description will explain the present invention in detail, based on the drawings illustrating an embodiment thereof. FIG. 1 is an exploded perspective view of a coupling structure according to the present invention. FIG. 2 is a plan view. FIG. 3 is a cross sectional view along the III—III line in FIG. 2. FIG. 4 is a cross sectional view along the IV—IV line in FIG. 2.

This coupling structure is for coupling a shaft body 1 having a non-circular engagement portion 11 on one end thereof with a shaft joint A, which comprises an engagement groove 21 with which the engagement portion 11 is engaged so that relative rotation is impossible, a shaft joint body 2 with two bores 22 and 23 facing the engagement groove 21 and a locking body 3 press-fitted into a bore 23, with a coupling shaft 4 inserted into the bores 22 and 23 and locked with the locking body 3. The coupling structure includes a plate body 5 supported between the locking body 3 and the shaft joint body 2.

One end of the shaft body 1 has: a non-circular engagement portion 11 having a pair of parallel flat faces 11a and 11b on a part of circular circumferential surface and a semi-circular slip-off preventing groove 11c with both ends facing the flat faces 11a and 11b; and a positioning recess 12 extending from one flat face 11a of the engagement portion 11 and having a flat part which is caved in more deeply than the flat face 11a.

The shaft joint body 2 comprises: a joint portion 24 with a substantially U-shaped cross section having an engagement groove 21 and two concentric bores 22 and 23 facing the engagement groove 21; and a yoke 25 extending from the joint portion 24 and having two concentric through bores (not shown).

In one side face of the engagement groove 21 of the shaft joint body 2, two receiving recesses 26 which are caved in more deeply than the side face are provided on the edge side in the depth direction. The receiving recesses 26 are provided from the vicinity of both ends in the longitudinal direction of the engagement groove 21 to the vicinity of the bore 22. Note that the shaft joint body 2 is made, for example, of carbon steel.

The locking body 3 comprises a press-fit cylindrical portion 31, and an edge portion 33 extending from the press-fit cylindrical portion 31 and having a threaded hole 32. The press-fit cylindrical portion 31 is press-fitted into the bore 23, and the edge portion 33 projects from the joint portion 24 to the outside. Note that the locking body 3 is made, for example, of structural steel.

Figure 5:
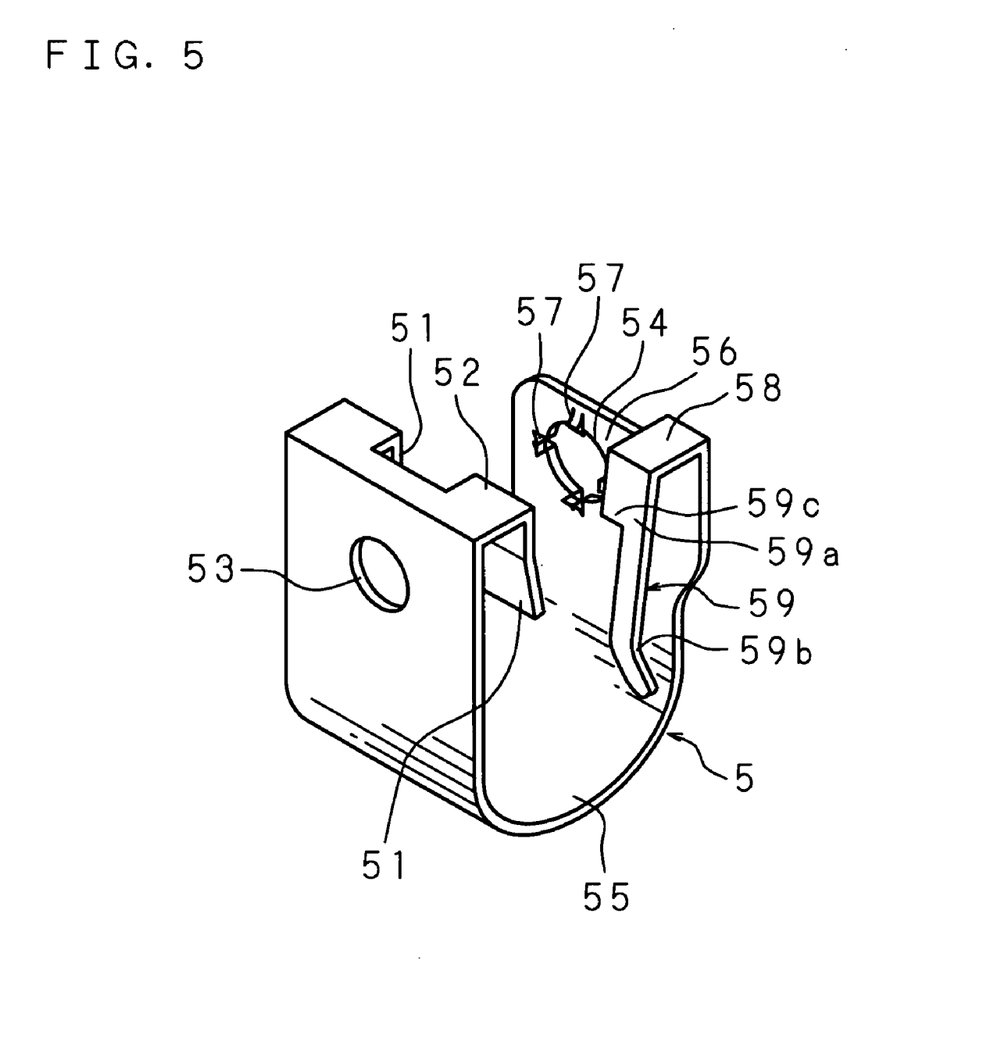
FIG. 5 is a perspective view of the plate body of the coupling structure of the present invention.

FIG. 5 is a perspective view of the plate body.

The plate body 5 is made of spring steel with hardness higher than that of the shaft joint body 2 and the locking body 3, and comprises: two regulating tongues 51 for regulating the movement of the shaft body 1 in the direction opposite to the insertion direction within the engagement groove 21; and a substantially U-shaped curved portion 55 connected to the regulating tongues 51 through a bent portion 52 and having through bores 53 and 54 corresponding to the bores 22 and 23. The through bore 54 of the curved portion 55 is referred to as a supported portion 56 which is supported between the joint portion 24 and the edge portion 33 by press-fitting the press-fit cylindrical portion 31 into the through bore 54. This supported portion 56 has a projection 57 projecting in the supported direction, in other words, inwardly in the plate thickness direction. Note that the interval between both ends of the curved portion 55 is larger than the width dimension of the joint portion 24, so that the curved portion 55 is deflected by a tightening fore of the coupling shaft 4.

The projection 57 is produced by cutting parallel two kerfs at four positions apart from each other in the circumferential direction of the through bore 54 and bending the partial pieces between the respective two kerfs inwardly in the plate thickness direction. When the supported portion 56 is supported between the joint portion 24 and the edge portion 33, the projection 57 cuts into the joint portion 24, and consequently a recessed portion 27 is formed in the joint portion 24.

The regulating tongues 51 are provided to regulate the movement of the shaft body 1 in the direction opposite to the insertion direction by contact of their ends with a part of the engagement portion 11 on the side opposite to the engagement direction. The regulating tongues 51 are apart from each other in the longitudinal direction of the engagement groove 21, face the receiving recesses 26, and are inclined toward one end of the curved portion 55 from the middle to the tip.

Moreover, the plate body 5 has a flexible member 59 which is connected to the vicinity of the supported portion 56 through a bent portion 58, disposed outside in the longitudinal direction of the engagement groove 21, and engaged with the positioning recess 12 of the shaft body 1 so as to deflect in the width direction of the engagement groove 21.

This flexible member 59 is provided to prevent engagement of the engagement portion 11 with the engagement groove 21 in a state where the engagement portion 11 is not engaged in the correct position of the engagement groove 21. The flexible member 59 comprises: a wide portion 59a extending from the bent portion 58; and a narrow portion 59b which is extending from the wide portion 59a and is narrower than the wide portion 59a. The narrow portion 59b is designed to deflect outwardly in the width direction of the engagement groove 21. The tip of the narrow portion 59b is bent outwardly in the width direction of the engagement groove 21 so that it is easy to put a finger or the like on the tip of the narrow portion 59b.

The flexible member 59 is positioned more inwardly than the other side face of the engagement groove 21. In the case where the engagement portion 11 is engaged with the engagement groove 21 in a state where the engagement portion 11 is not engaged in the correct position due to an insufficient amount of engagement, the engagement portion 11 comes into contact with the edge of the wide portion 59a, thereby preventing engagement of the engagement portion 11 with the engagement groove 21. On the other hand, when the engagement portion 11 is engaged in the correct position, the flexible member 59 is inserted into the positioning recess 12 and the narrow portion 59b is engaged with the positioning recess 12.

A part of the wide portion 59a serves as a deflection regulating portion 59c facing the other side face of the engagement groove 21. In the case where the engagement portion 11 is not engaged in the correct position due to an insufficient amount of engagement, if the engagement portion 11 comes into contact with the edge of the wide portion 59a, the deflection regulating portion 59c comes into contact with the side face of the engagement groove 21 and regulates the deflection of the narrow portion 59b. Besides, the wide portion 59a is located in a position where it does not come into contact with the engagement portion 11 when the engagement portion 11 is engaged with the engagement groove 21, and therefore the engagement portion 11 does not come into contact with the wide portion 59a when pulling out the shaft body 1 in the longitudinal direction of the engagement groove 21 by deflecting the narrow portion 59b and canceling the engagement of the narrow portion 59b with the positioning recess 12.

Figure 6:
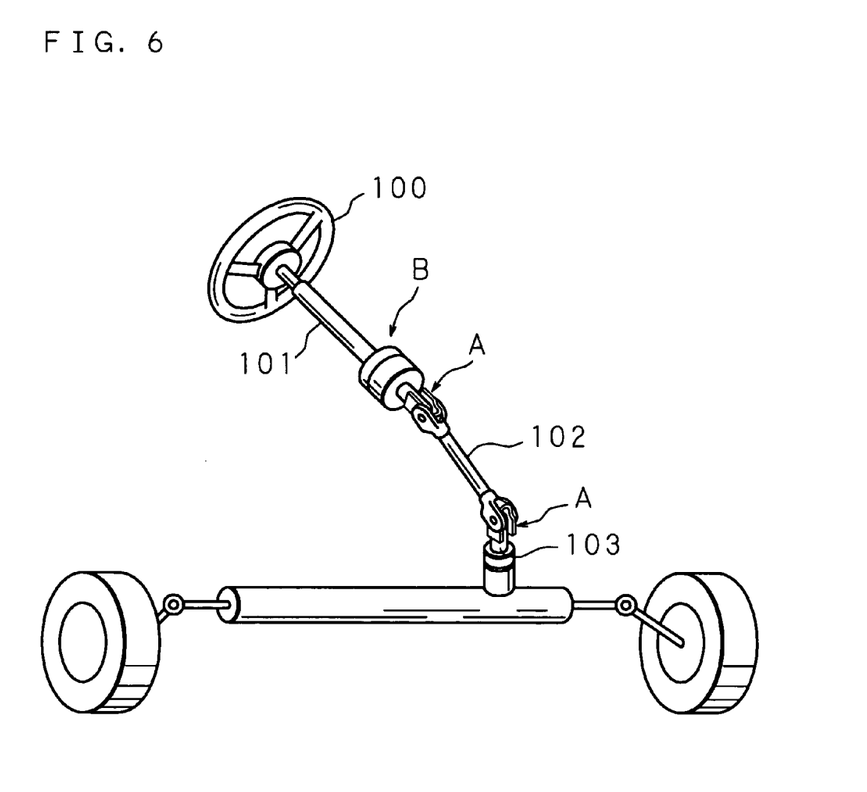
FIG. 6 is a schematic view showing an example of the coupling structure of the present invention applied to a steering apparatus.

FIG. 6 is a schematic view showing an example of the present invention applied to a steering apparatus.

The coupling structure constructed as described above is used, for example, in a steering apparatus B. This steering apparatus B comprises: a steering shaft 101 with one end connected to a steering wheel 100 for steering; a transmission shaft 102 with one end connected to the other end of the steering shaft 101 through a shaft joint A; and a pinion shaft 103 coupled to the other end of the transmission shaft 102 through another shaft joint A and having a pinion (not shown) meshing with the mid portion of a rack shaft (not shown) which extends in the left and right direction of a vehicle.

In the above-described structure, when coupling the plate body 5 to the shaft joint body 2, the supported portion 56 is supported between the joint portion 24 and the edge portion 33 by fitting the curved portion 55 of the plate body 5 into the joint portion 24 and press-fitting the press-fit cylindrical portion 31 of the locking body 3 into the bore 23 of the joint portion 24 from the through bore 54 in the supported portion 56, and the projection 57 in the supported portion 56 is caused to cut into the joint portion 24 by the press-fitting force during press fitting. As the projection 57 cuts into the joint portion 24, the recessed portion 27 is produced in the joint portion 24, and consequently the projection 57 is fitted into the recessed portion 27. It is therefore possible to prevent trembling of the plate body 5, and to support the plate body 5 without trembling. When the plate body 5 is fastened in this manner, the regulating tongues 51 are drawn into the receiving recesses 26 of the joint portion 24.

When coupling the shaft body 1 and the shaft joint A, the engagement portion 11 of the shaft body 1 is inserted into the engagement groove 21 from the edge side in the depth direction of the engagement groove 21 and engaged. In the case where the engagement portion 11 is engaged in the correct position as the amount of engagement between the engagement portion 11 and the engagement groove 21 is sufficient, the positioning recess 12 faces the flexible member 59. In the case where the engagement portion 11 is not engaged in the correct position due to an insufficient amount of engagement between the engagement portion 11 and engagement groove 21, the positioning recess 12 is apart from the flexible member 59 in the longitudinal direction of the engagement groove 21.

In the case where the engagement portion 11 is engaged in the correct position with a sufficient amount of engagement, when the engagement portion 11 is inserted into the engagement groove 21, the regulating tongues 51 are deflected and drawn into the receiving recesses 26, and the narrow portion 59b of the flexible member 59 is inserted into the positioning recess 12, thereby permitting engagement of the engagement portion 11 with the engagement groove 21. With this engagement, the slip-off preventing groove 11c faces the bores 22 and 23. Thereafter, by inserting the coupling shaft 4 configured as a bolt into the threaded hole 32 of the locking body 3 from the bore 22 and tightening the coupling shaft 4, the engagement portion 11 is fixed in the engagement groove 21. This fixing prevents relative rotation of the shaft body 1, and also prevents the shaft body 1 from being pulled out in the axial direction. Moreover, one side part of the curved portion 55 of the plate body 5 is pressed by the head of the coupling shaft 4, the regulating tongues 51 are displaced toward the inside of the engagement groove 21, and the tips of the regulating tongues 51 come into contact with a part of the engagement portion 11 on a side opposite to the insertion direction, thereby preventing the engagement portion 11 from swinging with the coupling shaft 4 as a fulcrum.

Figure 7:
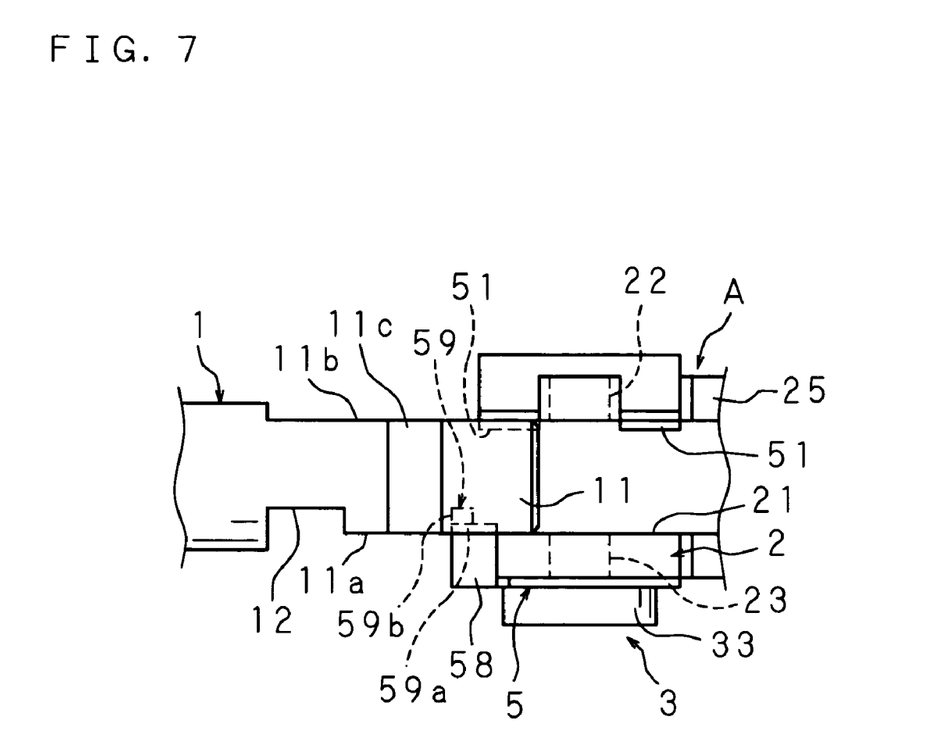
FIG. 7 is a view showing a state where the shaft body of the coupling structure of the present invention is not engaged in the correct position due to an insufficient amount of engagement between the shaft body and an engagement groove.

FIG. 7 is a view showing a state where the shaft body is not engaged in the correct position due to an insufficient amount of engagement between the shaft body and the engagement groove.

When the positioning recess 12 is apart from the flexible member 59 in the axial direction of the shaft body 1 and the shaft body 1 is not engaged in the correct position due to an insufficient amount of engagement, the engagement portion 11 comes into contact with the edge of the wide portion 59a of the flexible member 59 and can not be inserted into the engagement groove 21. It is therefore possible to judge that the engagement portion 11 is not engaged in the correct position due to an insufficient amount of engagement, and to avoid coupling in the state where the engagement portion 11 is not engaged in the correct position due to an insufficient amount of engagement. Note that since the flexible member 59 has the deflection regulating portion 59c, when the engagement portion 11 comes into contact with the edge of the wide portion 59a, the deflection regulating portion 59c comes into contact with the other side of the engagement groove 21 and can regulate deflection of the flexible member 59, thereby certainly preventing insertion of the engagement portion 11 into the engagement groove 21.

Figure 8:
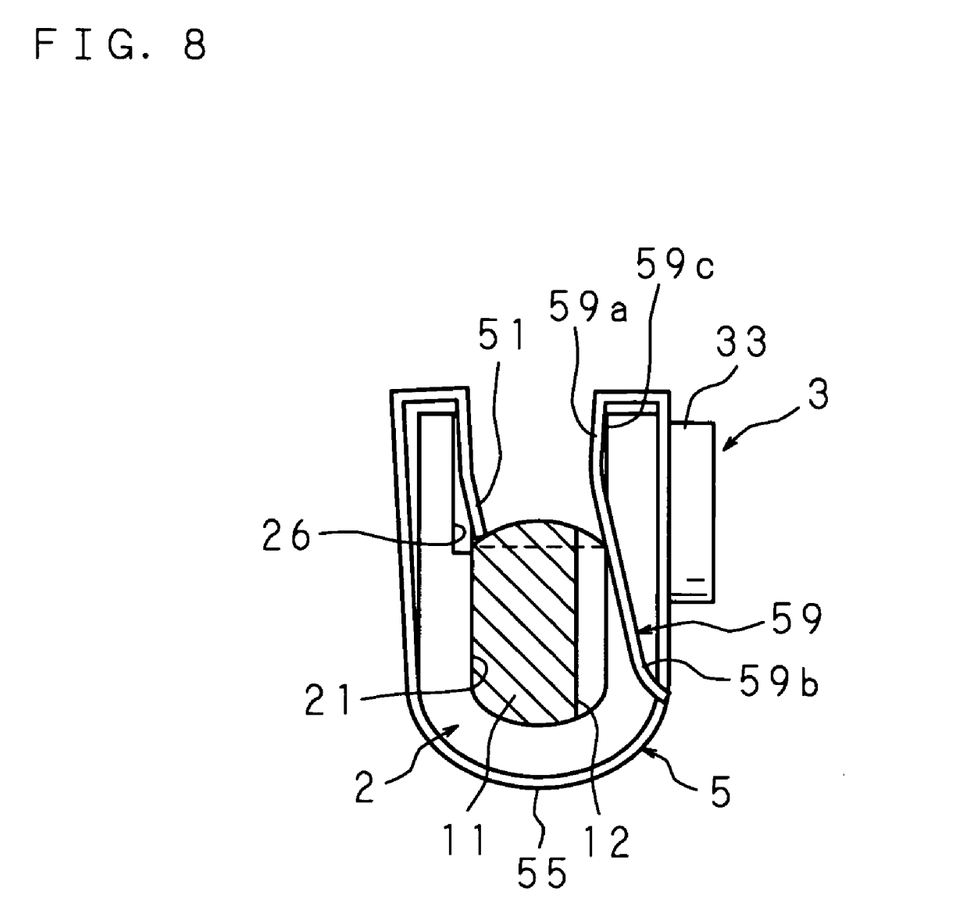
FIG. 8 is an explanatory view of canceling of the coupling of the shaft body and a shaft joint in the coupling structure of the present invention.

FIG. 8 is an explanatory view of canceling of the coupling of the shaft body and the shaft joint.

When canceling the coupling of the shaft body 1 and the shaft joint A at the time of maintenance, inspection or the like, a finger or the like is put on the tip of the narrow portion 59b of the flexible member 59 to deflect the narrow portion 59b outwardly in the width direction of the engagement groove 21. Consequently, the narrow portion 59b is displaced to the outside of the engagement groove 21, and it becomes possible to cancel the engagement of the flexible member 59 with the positioning recess 12 and to pull out the engagement portion 11 in the axial direction without being hindered by the flexible member 59. At this time, since the deflection regulating portion 59c of the flexible member 59 is located in a position where it does not come into contact with the engagement portion 11, the shaft body 1 can be pulled out in the longitudinal direction of the engagement groove 21 without being hindered by the flexible member 59.

Note that in the above-explained embodiment, kerfs are cut in the through bore 54 of the supported portion 56 to form the projection 57 by bending the partial piece between the kerfs, but it is also possible to form the projection 57 by cutting kerfs in a substantially square bracket shape in a position apart from the through bore 54 and bending the partial piece between the kerfs, or to form the projection 57 by molding without cutting kerfs. Moreover, although the projection 57 is constructed to project inwardly in the plate thickness direction, it is also possible to project the projection 57' of supported portion 56' outwardly in the plate thickness direction so as to cause the projection 57' to cut into the edge portion 33' of the locking body 3 by press-fitting force of the locking body 3, or to construct the shaft joint body 2' and supported portion 56" with projections 57, 57' to project in both sides in the plate thickness direction so as to cause the projection 57 to cut into the joint portion 24 and the projection 57' to cut into edge portion 33' by the press-fitting force of the locking body 3. Alternatively, in addition to causing the projection 57 to cut into the joint portion 24 and/or the edge portion 33' by the press-fitting force of the locking body 3, the recessed portion 27, 127 into which the projection 57 is to be inserted may be formed in advance in the joint portion 24 and/or the edge portion 33', so that the projection 57, 57' can be fitted into the recessed portion 27, 127 by the press-fitting force of the locking body 3.

Further, in the above-explained embodiment, although the hardness of the projection 57 is made higher than that of the shaft joint body 2 and the locking body 3 by using a plate body made of spring steel, it may be possible to use a plate body with hardness lower than that of the shaft joint body 2 and the locking body 3 and to make the hardness of the projection 57 higher than that of the shaft joint body 2 and the locking body 3 by applying surface treatment, such as quenching, at least on the projection 57.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A coupling structure, comprising:
   a shaft body including a slip-off preventing groove;
   a shaft joint including:
      an engagement groove with which the shaft body is engaged;
      a shaft joint body with two bores facing the engagement groove; and
      a locking body press-fined into one of the bores; and
   a coupling shaft for coupling the shaft body and the shaft joint by being inserted into the bores and slip-off preventing groove and locked with the locking body,
   the shaft joint further including:
   a regulating tongue far regulating movement of the shaft body;
   a plate body press fitted between the locking body and the shaft joint by the locking body and having a flexible member for guiding a positioning recess of the shaft body into the shaft joint, a curved portion, and a supported portion; and
   the supported portion extending from the curved portion of the plate body, superposed between a surface of the locking body and a surface of the shaft joint body, and having a projection incised into at least one of the shaft joint and locking body, wherein at least one of the shaft joint body and the locking body has a recessed portion into which the projection is fitted.

2. The coupling structure according to claim 1, wherein the projection has hardness higher than hardness of at least one of the shaft joint body and the locking body.

3. The coupling structure according to claim 2, wherein the projection is made of spring steel with hardness higher than hardness of at least one of the shaft joint body and the locking body.

4. The coupling structure according to claim 3, wherein the projection is formed by providing a through bore on the supported portion with kerfs and bending a partial piece between the kerfs.

5. The coupling structure according to claim 2, wherein the projection is formed of a material with hardness not higher than hardness of at least one of the shaft joint body and the locking body, and the hardness of the projection is made higher than hardness of at least one of the shaft joint body and the locking body by applying surface treatment.

6. The coupling structure according to claim 5, wherein the projection is formed by providing a through bore on the supported portion with kerfs and bending a partial piece between the kerfs.

7. The coupling structure according to claim 2, wherein the projection is formed by providing a through bore on the supported portion with kerfs and bending a partial piece between the kerfs.

8. The coupling structure according to claim 1, wherein the projection is formed by providing a through bore on the supported portion with kerfs and bending a partial piece between the kerfs.

9. The coupling structure according to claim 2, wherein the projection is formed of a material having a first hardness less than or equal to a hardness of at least one of the shaft joint body and the locking body, the hardness of the projection is increased to a second hardness greater than the hardness of at least one of the shaft joint body and the locking body by applying a surface treatment.

10. A coupling structure, comprising:
    a shaft body;
    a shaft joint including an engagement groove with which the shaft body is engaged, a shaft joint body with two bores facing the engagement groove, and a locking body press-fitted into one of the bores; and
    a coupling shaft for coupling the shaft body and the shaft joint by being inserted into the bores and locked with the locking body,
    the shaft joint further including:
    a regulating tongue for regulating movement of the shaft body;
    a plate body having a curved portion; and
    a supported portion extending from the curved portion of the plate body, superposed between a surface of the locking body and a surface of the shaft joint body, and having a plurality of projections,
    wherein both the shaft joint body and the locking body have a recessed portion into which at least one of the plurality of projections is respectively fitted.

11. The coupling structure according to claim 10, wherein the one projection has hardness higher than hardness of at least one of the shaft joint body and the locking body.

12. The coupling structure according to claim 11, wherein the one projection is made of spring steel with hardness higher than hardness of at least one of the shaft joint body and the locking body.

13. The coupling structure according to claim 12, wherein the one projection is formed by providing a through bore on the supported portion with kerfs and bending a partial piece between the kerfs.

14. The coupling structure according to claim 11, wherein the one projection is formed of a material with hardness not higher than hardness of at least one of the shaft joint body and the locking body, and the hardness of the projection is made higher than hardness of at least one of the shaft joint body and the locking body by applying surface treatment.

15. The coupling structure according to claim 14, wherein the one projection is formed by providing a through bore on the supported portion with kerfs and bending a partial piece between the kerfs.

16. The coupling structure according to claim 11, wherein the one projection is formed by providing a through bore on the supported portion with kerfs and bending a partial piece between the kerfs.

17. The coupling structure according to claim 10, wherein the one projection is formed by providing a through bore on the supported portion with kerfs and bending a partial piece between the kerfs.

18. The coupling structure according to claim 11, wherein the one projection is formed of a material having a first hardness less than or equal to a hardness of at least one of the shaft joint body and the locking body, the hardness of the one projection being increased to a second hardness greater than the hardness of at least one of the shaft joint body and the locking body by applying a surface treatment.

* * * * *